US012662337B1

(12) United States Patent　　　　　(10) Patent No.:　US 12,662,337 B1

Dueweke　　　　　　　　　　　　　　(45) Date of Patent:　　Jun. 23, 2026

(54) CONE LOADING MACHINE

(71) Applicant: Sesh Technologies Manufacturing Inc., Spokane, WA (US)

(72) Inventor: Jason Dueweke, Deer Park, WA (US)

(73) Assignee: Sesh Technologies Manufacturing Inc., Spokane, WA (US)

( * ) Notice: Subject to any disclaimer, the term of this patent is extended or adjusted under 35 U.S.C. 154(b) by 490 days.

(21) Appl. No.: 18/223,899

(22) Filed: Jul. 19, 2023

Related U.S. Application Data

(60) Provisional application No. 63/425,256, filed on Nov. 14, 2022.

(51) Int. Cl.
　B65G 59/10　　　　　(2006.01)
　B65G 59/06　　　　　(2006.01)

(52) U.S. Cl.
　CPC ........... B65G 59/10 (2013.01); B65G 59/061 (2013.01); B65G 59/106 (2013.01); B65G 2201/0226 (2013.01)

(58) Field of Classification Search
　CPC . B01L 9/543; A24C 5/352; B65G 2201/0226; B65B 43/44; B65B 35/32; B65B 7/2807; B65B 35/02
　USPC .................................................. 221/221, 93
　See application file for complete search history.

(56)　　　　　　References Cited

U.S. PATENT DOCUMENTS

| | | | | |
|---|---|---|---|---|
| 2,946,480 | A * | 7/1960 | Farber .................. | B65G 59/101 221/221 |
| 3,104,780 | A * | 9/1963 | Carter et al. ............ | B65B 43/44 221/210 |
| 3,169,356 | A * | 2/1965 | Dye ........................ | G07F 13/10 221/268 |
| 3,181,728 | A * | 5/1965 | West .................... | B65G 59/101 222/93 |
| 3,420,407 | A * | 1/1969 | Christine ............. | B65G 59/105 221/221 |
| 5,588,792 | A * | 12/1996 | Tiso ........................ | B01L 9/543 221/221 |
| 6,581,356 | B2 * | 6/2003 | Kim ........................ | G07F 11/44 221/124 |
| 7,178,688 | B2 * | 2/2007 | Naufel .................... | G07F 11/62 221/13 |
| 8,297,472 | B2 * | 10/2012 | Santos .................... | B29C 31/08 221/95 |

* cited by examiner

*Primary Examiner* — Gregory W Adams
(74) *Attorney, Agent, or Firm* — Lee & Hayes, P.C.

(57)　　　　　　ABSTRACT

A device includes a cassette, a tray located vertically below the cassette, and a transfer mechanism located vertically above. The cassette has first receptacles, where individual first receptacles configured to receive a stack of pre-rolled cones. The tray has second receptacles, where individual second receptacles are configured to receive a pre-rolled cone from the stack of pre-rolled cones. The transfer mechanism has implements, where individual implements are configured to transfer the pre-rolled cone from the stack of pre-rolled cones from the second receptacles to the first receptacles.

20 Claims, 21 Drawing Sheets

100

308

306

300

204

302

200

206

208

210

304

100

306

300

200

206

208

300

506

500

308

514(2)

306

510

514(1)

504

200

508

204

200

618

512

612

1100

614

616

620

624

1006

206

1008

1100

1000

Y

X

1500

RECEIVE DATA ASSOCIATED WITH TRANSFERRING PRE-ROLLED CONES FROM A CASSETTE TO A TRAY 1502

CASSETTE LOADED? 1504

NO

YES

CAUSE A FIRST INDICATION TO BE OUTPUT 1506

TRAY LOADED? 1508

NO

YES

CAUSE ONE OR MORE IMPLEMENTS TO BE ACTUATED TO TRANSFER THE PRE-ROLLED CONES 1510

ADDITIONAL TRANSFER? 1512

YES

NO

CAUSE A SECOND INDICATION TO BE OUTPUT 1514

CAUSE THE ONE OR MORE IMPLEMENTS TO BE RETRACTED 1516

CONE LOADING MACHINE

CROSS-REFERENCE TO RELATED APPLICATIONS

This application claims priority to U.S. Provisional Application No. 63/425,256, filed Nov. 14, 2022, entitled "Cone Loading Machine," the entirety of which is herein incorporated by reference.

BACKGROUND

Machines may be used to automate manufacturing processes. In some examples, machines may be designed to produce a manufactured product including delicate materials that are required to be combined in specific manner.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
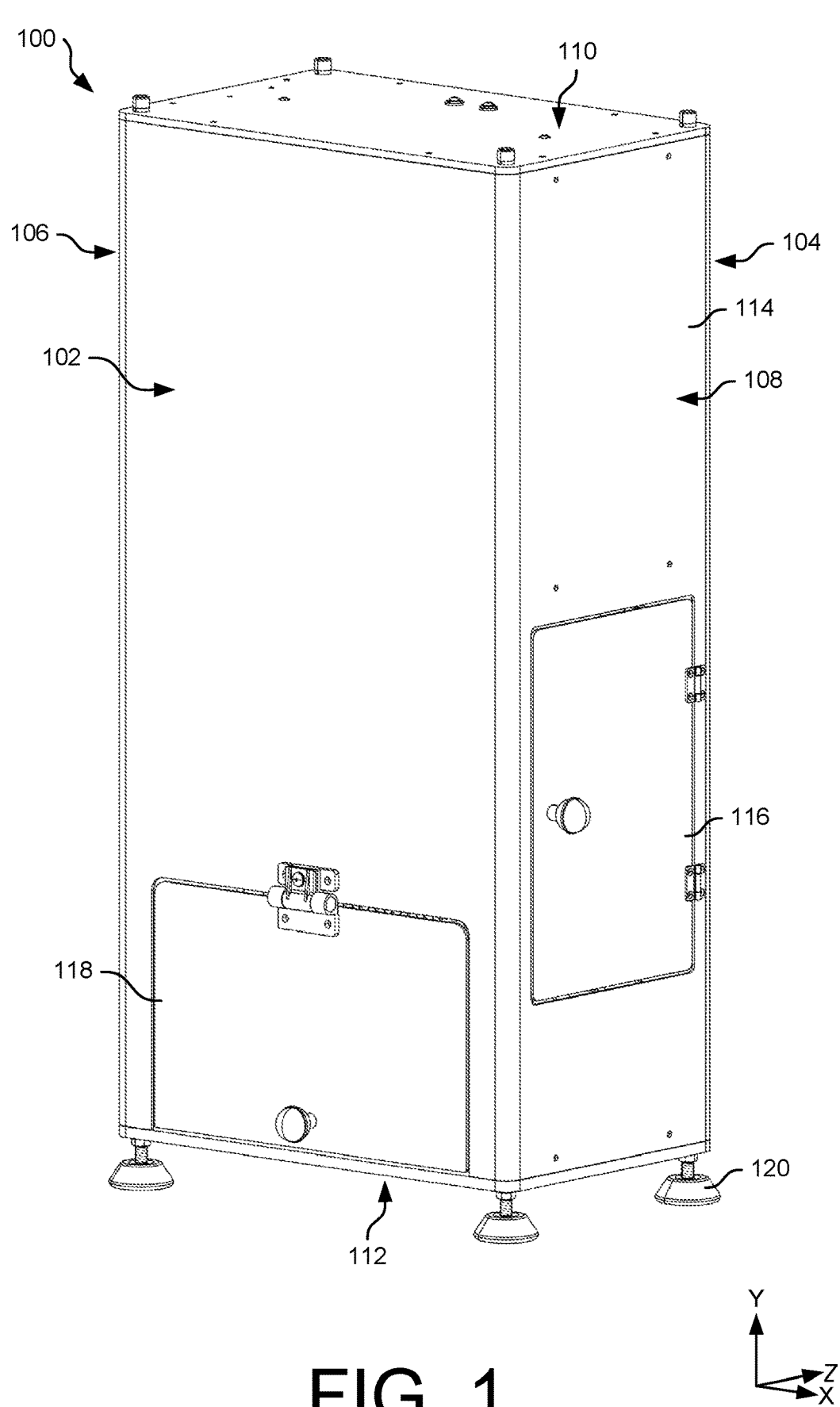
FIG. 1 illustrates a perspective view of an example cone loading machine, according to examples of the present disclosure.

This application is directed, at least in part, to a cone loading machine that is configured to individually transfer pre-rolled cones from a stack of pre-rolled cones. In some instances, the cone loading machine may include a housing, a cassette, a transfer mechanism, and a tray. The cassette, the transfer mechanism, and the tray may be arranged on or within the housing. The cassette may receive a plurality of pre-rolled cones, such as the stacks of pre-rolled cones, and the transfer mechanism may be actuatable to transfer the plurality of pre-rolled cones from the cassette and into the tray. For example, the plurality of pre-rolled cones may be arranged in individual stacks, and as the transfer mechanism is actuated, individual pre-rolled cones within the stacks may be transferred into the tray. As the pre-rolled cones are transferred, the tray becomes full and an additional tray may be inserted into the cone loading machine. Therein, the cone loading machine may transfer additional pre-rolled cones to the additional tray. Additionally, after the tray is loaded, the plurality of pre-rolled cones may be packed with material (e.g., tobacco, hookah, etc.). As such, the cone loading machine may increase a productivity in manufacturing.

In some instances, the cassette includes a plurality of receptacles that receive the stacks of pre-rolled cones, where individual receptacles receive individual stacks of pre-rolled cones. The pre-rolled cones themselves may be substantially conically shaped, and may be made of a material including at least one of refined white paper, unrefined brown paper, recycled paper, hemp paper, palm leaf, and the like. Initially, a user, an operator, or a machine may form the pre-rolled cones. Thereafter, the user, the operator, or the machine (whether the same or different machine used to form the pre-rolled cones) may stack the individual pre-rolled cones. For example, the pre-rolled cones may include an opened top, and a partially enclosed base. The pre-rolled cones may be stacked such that the partially enclosed base of one pre-rolled cone is inserted into the opened top of another pre-rolled cone. Any number of the pre-rolled cones may be stacked together (e.g., two, eight, twenty, etc.) and the cassette may include any number of receptacles (e.g., forty, seventy-two, one hundred, four hundred, etc.) to receive the stacks of pre-rolled cones. Examples of forming pre-rolled cones are described in, for example, U.S. patent application Ser. No. 17/108,604, filed Dec. 1, 2020, entitled "Automated Paper Cone Shaping and Arrangement Machine," the entirety of which is herein incorporated by reference in its entirety and for all purposes.

In some instances, the receptacles of the cassette include different cross-sectional shapes for receiving the stacks of pre-rolled cones, and for effectuating transfer of the pre-rolled cones to the tray. For example, in some instances, a first portion (e.g., first length) of the receptacles may include a first cross-sectional shape (e.g., circular), while a second portion (e.g., second length) of the receptacles may include a second cross-sectional shape (e.g., conical). When placed within the receptacles, the stacks of pre-rolled cones are configured to rest, or be retained within, the receptacles. Once load, the cassette, with the stacks of pre-rolled cones, is insertable into the housing of the cone loading machine.

The cassette may reside vertically below the transfer mechanism, which includes implements (e.g., rods, pins, etc.) that are actuatable to transfer the pre-rolled cones from the cassette to the tray. As the implements are actuated, by one or more actuators, for example, the pre-rolled cones are transferred to the tray. That is, individual pre-rolled cones from the stacks of pre-rolled cones may be pushed out of the receptacles and into the tray. In some instances, the tray may itself include receptacles that are aligned with the receptacles of the cassette to receive the pre-rolled cones. For example, individual receptacles of the tray may be aligned with individual receptacles of the cassette. In some instances, the receptacles of tray are conically shaped to receive and retain the pre-rolled cones once transferred from the cassette.

In some instances, the cone loading machine is configured to operate any number of cycles for transferring the pre-rolled cones from the cassette into one or more trays. For example, noted above, the stacks of pre-rolled cones may be made up of any number of pre-rolled cones, such as eight. In the event that the pre-rolled cones are arranged into stacks of eight, the cone loading machine may operate eight cycles to transfer the pre-rolled cones to eight trays. Here, the eight trays may include respective receptacles for receiving the pre-rolled cones. Individually, the individual pre-rolled cones form the stacks of pre-rolled cones may be transferred to the trays. For example, a first tray may include first receptacles that receive first pre-rolled cones from the stacks of pre-rolled cones. After the implements transfer the first pre-rolled cones, the first tray may be removed from the cone loading machine, and a second tray having second receptacles may be inserted into the cone loading machine. Thereafter, second pre-rolled cones may be transferred from the stacks of pre-rolled cones and into the second receptacles. The second tray may then be removed. This process may repeat until all the pre-rolled cones within the stacks have been transferred to the trays. As such, in the event that the pre-rolled cones are arranged in stacks of eight, the cone loading machine may conduct eight cycles for transferring the pre-rolled cones across eight trays. After all of the pre-rolled cones are transferred, the implements may be retracted such that a new cassette having the stacks of pre-rolled cones arranged therein (i.e., within the receptacles) may be replaced with the cassette. Alternatively, the cassette may be replenished with new stacks of pre-rolled cones.

In some instances, the implements of the transfer mechanism are actuatable at the same time to transfer the pre-rolled cones across any number of receptacles of the cassettes to any number of receptacles in the tray. For example, in the event that the cassette includes seventy two receptacles, the cone loading machine may include seventy two implements that are actuated at the same time to transfer seventy two pre-rolled cones into seventy two receptacles of the tray. The one or more actuators that actuate the implements may include screw drives, hydraulic actuators, pneumatic actuators, stepper motors, and so forth. Additionally, the one or more actuators may be configured to actuate by a certain amount (e.g., step) such that the implements move a certain distance for transferring the pre-rolled cones one by one. That is, the implements may move a certain distance such that one pre-rolled cone is transferred from the stacks of pre-rolled cones into the receptacles across the tray. Once the pre-rolled cones from the stacks have been transferred, the one or more actuators may retract the implements such that the new cassette having the pre-rolled cones may be inserted into the machine.

In some instances, the cone loading machine may include sensors that are configured to generate sensor data indicative of the cassette and/or the tray being loaded into the cone loading machine. This may, for example, prevent the cone loading machine operating without the cassette and/or the tray, thereby avoiding waste and/or inefficiencies. For example, the implements may not be actuated until the cassette and/or the tray are loaded into the machine. Additionally, sensors may detect whether the pre-rolled cones have been transferred into the receptacles, respectively. For example, in some instances, the pre-rolled cones may be stuck or become jammed within the cassette and fail to be transferred to the tray. In these instances, one or more mechanisms (e.g., pullers, grippers, etc.) may be actuated to complete a transfer of the pre-rolled cones into the tray.

In some instances, one or more buttons may be used to operate the cone loading machine. For example, upon actuation of the one or more buttons, the implements of the transfer mechanism may be actuated. During this process, the cone loading machine may determine whether the cassette and/or the tray is/are loaded into the cone loading machine (e.g., via sensor data generated from the sensor(s)). Additionally, or alternatively, the cone loading machine may operate autonomously to transfer the pre-rolled cones to the tray. For example, the cone loading machine may sense that an empty tray has been placed into the cone loading machine, and thereafter, may actuate the implements by a certain distance to transfer the pre-rolled cones. From there, an operator may remove the tray, insert a new tray, and the cone loading machine may automatically resume operations (e.g., via sensing the empty tray). The cone loading machine may include additional or alternative components, such as different input/output components (e.g., touch screen, display, etc.), speaker(s), microphone(s), lighting element(s), and so forth.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims. Additional details are described below with reference to several example embodiments.

FIG. 1 illustrates a perspective view of an example cone loading machine 100, according to examples of the present disclosure. In some instances, the cone loading machine 100 may include a front 102, a back 104 (spaced apart from the front 102 in the Z-direction), a first side 106, a second side 108 (spaced apart from the first side 106 in the X-direction), a top 110, and a bottom 112 (spaced apart from the top 110 in the Y-direction).

The cone loading machine 100 may include a housing 114 that houses or encloses components of the cone loading machine 100 (as discussed herein). The housing 114, or more generally the cone loading machine 100, is shown including a rectangular shape. In some instances, the housing 114 disposed over one or more sides of the cone loading machine 100 (e.g., the front 102, the back 104, the first side 106, and/or the second side 108).

A first door 116 may hingedly couple (e.g., about the Y-axis) to the housing 114 along/at the second side 108, and/or a second door 118 may hingedly couple (e.g., about the X-axis) to the housing 114 along/at the front 102. In some instances, the first door 116 may open such that a cassette is insertable into the housing 114. As will be explained herein, the cassette may include, or be loaded with, stacks of pre-rolled cones. The first door 116 may additionally be opened such that a new cassette having stacks of pre-rolled cones is inserted into the housing 114 (e.g., after a first cassette is emptied of the pre-rolled cones). The second door 118 may open such that a tray, which receives the pre-rolled cones from the cassette, is insertable into the housing 114. The second door 118 may additionally be opened such that a new tray is insertable into the housing 114 (e.g., after the pre-rolled cones have been transferred to the tray). As shown, the first door 116 and/or the second door 118 may be located more proximate to the bottom 112 as compared to the top 110.

One or more feet 120 may be disposed on the bottom 112 of the cone loading machine 100 for disposing the housing 114 above a ground surface, and/or for leveling the cone loading machine 100.

Figure 2:
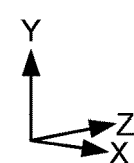
FIG. 2 illustrates a perspective view of the cone loading machine of FIG. 1, showing example doors of the cone loading machine removed to illustrate an interior of the cone loading machine, according to examples of the present disclosure.

FIG. 2 illustrates a perspective view of the cone loading machine 100, showing the first door 116 and the second door 118 removed to illustrate an interior of the housing 114, according to examples of the present disclosure. The cone loading machine 100 is configured to receive a cassette 200 having a plurality of pre-rolled cones. For example, the pre-rolled cones may be arranged in stacks and then the stacks of pre-rolled cones may be placed within the cassette 200. As will be explained herein, the cassette 200 may include receptacles (e.g., slots, sleeves, etc.) into which the stacks of pre-rolled cones are configured to be received.

The first door 116 may be opened such the cassette 200 may be placed within the housing 114. The housing 114, for example, may include a first opening 202 through which the cassette 200 is insertable. When the first door 116 couples to the housing 114, the first door 116 may reside within the first opening 202. The cassette 200, as shown, may be insertable into the via the second side 108. The cone loading machine 100 may include first slides 204 (e.g., drawer slide, rails, hangers, tracks etc.) for receiving the cassette 200. For example, the cassette 200 may be slid into and out of the housing 114 via the first slides 204 (e.g., in the X-direction). When being loaded with the cassette 200 or the stacks of pre-rolled cones, a portion of the first slides 204 may reside external to the housing 114, such that the cassette 200 may be loaded onto the first slides 204, or such that the stacks of pre-rolled cones may be loaded into the cassette 200. Therein, the cassette 200 may be slid into the housing 114, via the first slides 204, and the first door 116 may be closed. At this point, the cassette 200 may be loaded into the cone loading machine 100 such that the pre-rolled cones are transferrable from the cassette 200. The cassette 200 may, in some instances, be removably coupled to the first slides 204.

The cone loading machine 100 may also include a tray 206 that is configured to receive the pre-rolled cones from the stacks of pre-rolled cones arranged in the cassette 200. For example, the tray 206 may include receptacles that receive the pre-rolled cones from the cassette 200. In some instances, the tray 206 may be disposed within a drawer 208. The cone loading machine 100 may include second slides 210 (e.g., drawer slide, rails, hangers, tracks etc.) for receiving the drawer 208. For example, the drawer 208 may be slid into and out of the housing 114 via the second slides 210 (e.g., in the Z-direction). To load the tray 206 into the cone loading machine 100 (or the housing 114), the second door 118 may be opened and the drawer 208 may be slide out through a second opening 212 of the housing 114. When being loaded with the tray 206, a portion of the second slides 210 may reside external to the housing 114. The tray 206 may then be loaded into the drawer 208. Therein, the tray 206, which resides within the drawer 208, for example, may be slid into the housing 114 via the second slides 210. At this point, the tray 206 may be loaded into the cone loading machine 100 such that the pre-rolled cones are transferrable from the cassette 200 to the tray 206. After being loaded with the pre-rolled cones, the drawer 208 may be slid out and the tray 206 may be removed. Another tray may be placed into the drawer 208 and loaded into the cone loading machine 100. Alignment mechanism(s) may align the tray 206 on, or within, the drawer 208.

The tray 206 may be located vertically below (e.g., in the Y-direction) the cassette 200 such that the tray 206 receives the pre-rolled cones from the cassette 200. As such, the tray 206 may be located closer to the bottom 112 than the cassette 200. Moreover, although the cassette 200 and the tray 206 are described as being loaded or accessible from certain sides of the housing 114, the cassette 200 and/or the tray 206 may be loaded or accessible from other sides of the housing 114.

Figure 3:
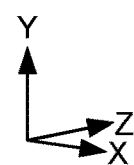
FIG. 3 illustrates a perspective view of the cone loading machine of FIG. 1, showing an example housing of the cone loading machine removed to illustrate an interior of the cone loading machine, according to examples of the present disclosure.

FIG. 3 illustrates a perspective view of the cone loading machine 100, showing the housing 114 removed to illustrate components of the cone loading machine 100, according to examples of the present disclosure. As introduced above, the cone loading machine 100 may include the cassette 200, the tray 206, and the drawer 208 in which the tray 206 is configured to reside. Additionally, the cone loading machine 100 may include a transfer mechanism 300. In some instances, collectively, the cassette 200, the tray 206, the drawer 208, and the transfer mechanism 300 may represent components of the cone loading machine 100.

The cone loading machine 100 may include the first slides 204 that receive the cassette 200. The cassette 200 may be pulled (e.g., in the X-direction) out the first opening 202, for example, via a first handle 302. Once pulled out of the housing 114, the cassette 200 may loaded with stacks of pre-rolled cones. Thereafter, the cassette 200 may be pushed back into the housing 114. Alternatively in some instances, the cassette 200 may be replaced with another cassette that is already loaded with the stacks of pre-rolled cones. This may, for example, allow the cassettes to be easily swapped out with one another for reducing a down time of the cone loading machine 100

The cone loading machine 100 also includes the second slides 210 that receive the drawer 208. The drawer 208 may be pulled (e.g., in the Z-direction) out the second opening 212, for example, via a second handle 304. Once residing outside the housing 114, the tray 206 may be placed into the drawer 208, and therein the drawer 208 may be pushed back into the housing 114. The first slides 204 and/or the second slides 210 may represent roller bearings, linear slides, etc.

that allow the cassette 200 and the drawer 208 to be conveniently moved into and out of the housing 114, respectively. The first slides 204 may be moveable in a first direction (e.g., the X-direction), while the second slides 210 may be movable in a second direction (e.g., the Z-direction). In some instances, the second direction may be orthogonal to the first direction.

The transfer mechanism 300 includes implements 306 (e.g., rods, pins, etc.) that serve to transfer the pre-rolled cones from the cassette 200 and into the tray 206. The implements 306 are located vertically above the cassette 200 (e.g., in the Y-direction). In some instances, the implements 306 vertically actuate to transfer (e.g., push) the pre-rolled cones from the cassette 200 to the tray 206. As will be explained herein, the implements 306 may have a range of travel (e.g., in the Y-direction) in order to transfer the pre-rolled cones from the stack of pre-rolled cones that reside in the cassette 200 into the tray 206.

The cone loading machine 100 may also include a frame 308 to which the cassette 200, the drawer 208, the first slides 204, the second slides 210, the transfer mechanism 300, as well as other components of the cone loading machine 100 couple. The frame 308 may also include various mounts, brackets, etc. for receiving the cassette 200, the drawer 208, the first slides 204, the second slides 210, the transfer mechanism 300, as well as other components of the cone loading machine 100.

Figure 4:
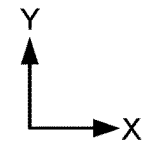
FIG. 4 illustrates a side view of the cone loading machine of FIG. 1, showing an example housing of the cone loading machine removed to illustrate an interior of the cone loading machine and example components, according to examples of the present disclosure.

FIG. 4 illustrates a side view of the cone loading machine 100, showing the housing 114 removed to illustrate the components of the cone loading machine 100, according to examples of the present disclosure. In some instances, the view shown in FIG. 4 represents the front 102 of the cone loading machine 100. As shown, the transfer mechanism 300 may reside vertically above the cassette 200 and the tray 206, and the cassette 200 may reside vertically above the drawer 208 and the tray 206. As such, the transfer mechanism 300 may be located closer to the top 110 as compared to the cassette 200, drawer 208, and the tray 206. The cassette 200 may be located closer to the top 110 as compared to the drawer 208 and the tray 206.

As introduced above, the implements 306 of the transfer mechanism 300 may actuate in a direction towards the cassette 200 (e.g., towards the bottom 112) for transferring pre-rolled cones arranged in stacks of pre-rolled cones from the cassette 200 to the tray 206. During this instance, and as the pre-rolled cones are transferred from the stacks of pre-rolled cones, the implements 306 may reside within a portion of the cassette 200, such as receptacles of the cassette 200 in which the stacks of pre-rolled cones reside. That is, an end of the implements 306 may plunge or descend into the receptacles of the cassette 200 for pushing one of the pre-rolled cones out from the stack of pre-rolled cones. As such, as the implements 306 are actuated, individual pre-rolled cones of the stacks of pre-rolled cones fall (e.g., via gravity) out of the cassette 200 and into the tray 206, which includes corresponding receptacles for receiving the pre-rolled cones.

Figure 5A:
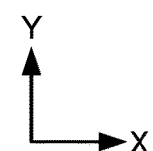
FIGS. 5A-5C illustrate an example transfer mechanism of the cone loading machine of FIG. 1, according to examples of the present disclosure.
Figure 5B:
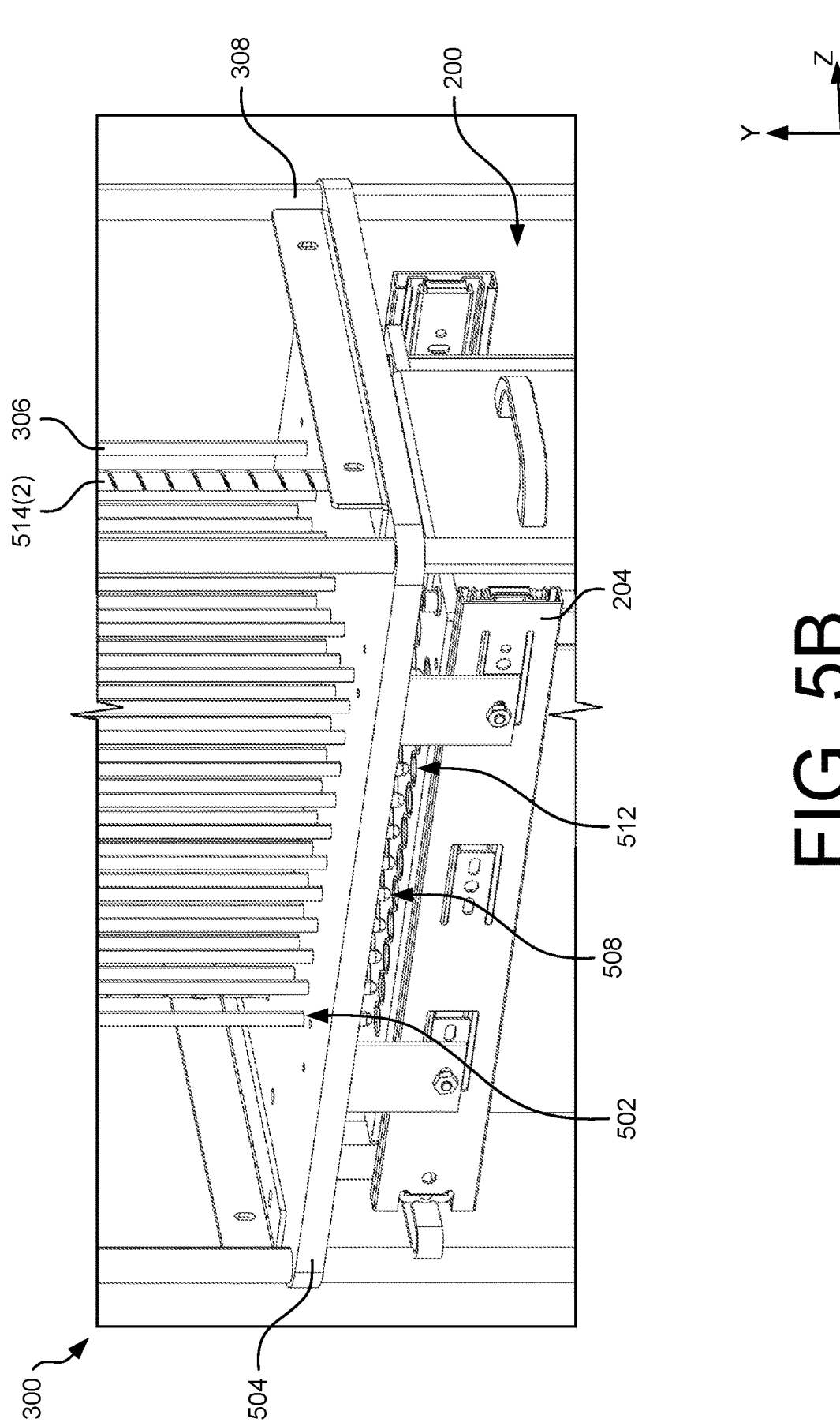
Figure 5C:
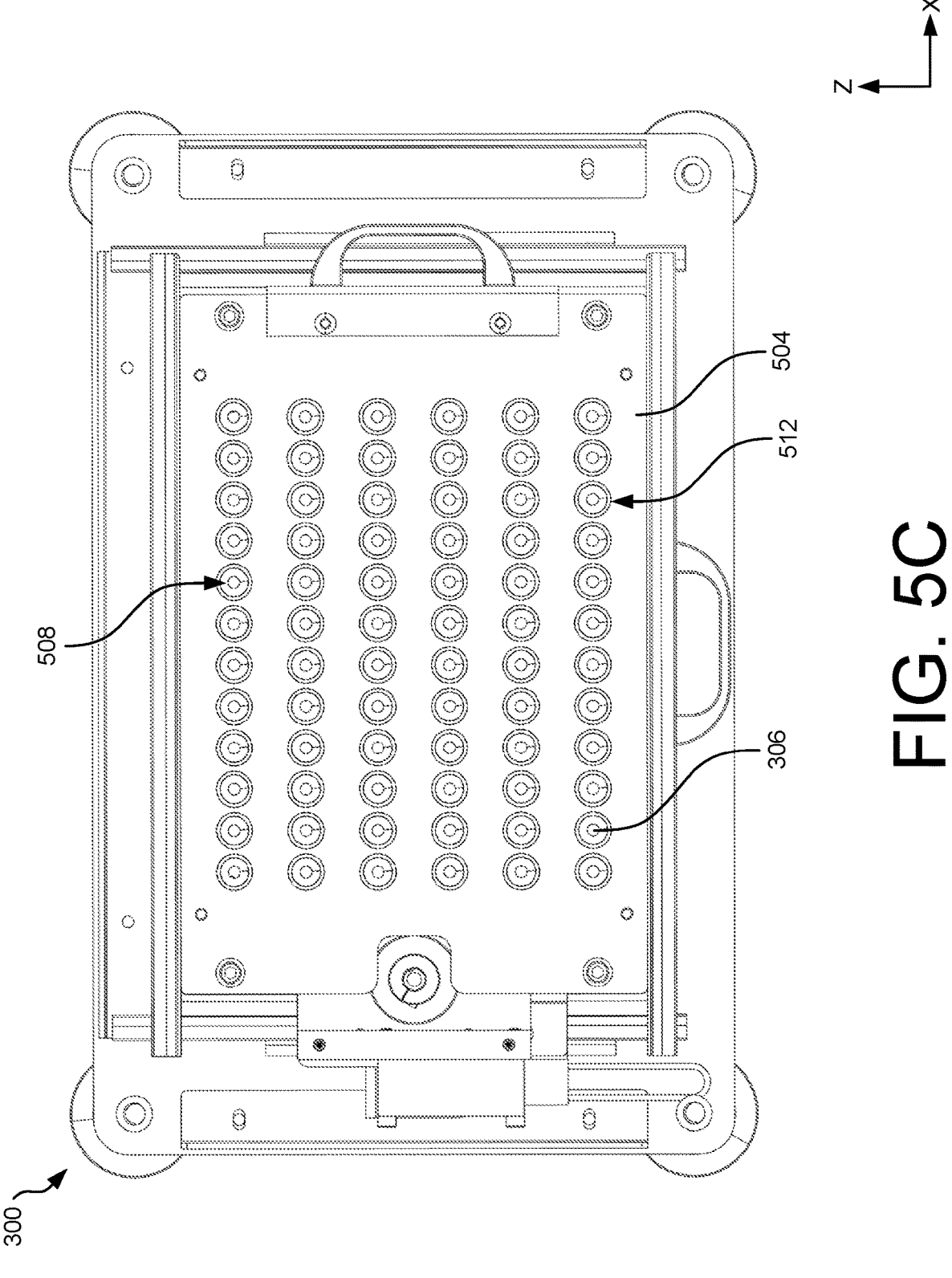

FIGS. 5A-5C illustrate the transfer mechanism 300, according to examples of the present disclosure. In some instances, the implements 306 are coupled to a first plate 500 and extend through passages 502 in a second plate 504. For example, the implements 306 may translate further and further through the passages 502 as the implements 306 are actuated to push the pre-rolled cones from the cassette 200 to the tray 206. The passages 502 may align the implements 306 or maintain an alignment of the implements 306 during transfer of the pre-rolled cones. In some instances, the implements 306 are arranged in a grid-line fashion, within rows and columns. However, the implements 306 may be arranged in other manners (e.g., pattern, staggered, etc.).

The implements 306 may include a first end 506 and a second end 508 spaced apart from the first end 506 (e.g., in the Y-direction). A length of the implements 306 extends between the first end 506 and the second end 508. In some instances, the first end 506 couples to the first plate 500, while the second end 508 may be disposed through the second plate 504, or reside vertically beneath the second plate 504 (e.g., in the Y-direction), and through the passages 502. As the implements 306 are actuated, a gap distance 510 between the first plate 500 and the second plate 504 may decrease, and a distance at which the second end 508 of the implements 306 are spaced apart from the second plate 504 may increase (e.g., in the Y-direction). The first plate 500 may be movable over the gap distance 510, within a range of travel. The first plate 500 may be slidably coupled to the frame 308, while in some instances, the second plate 504 may be coupled to the frame 308. In some instances, the implements 306 may include a cylindrical cross-sectional shape, however, other shapes are envisioned.

In some instances, one or more screw drives 514 (e.g., a first screw drive 514(1) and a second screw drive 514(2)) operably couple the first plate 500 and the second plate 504. The cone loading machine 100 may include one or more motors or actuators that, when actuated, push the implements 306 incrementally through the second plate 504. For example, when actuated in a first direction, the screw drives 514 may move the first plate 500 (and correspondingly the implements 306) towards the cassette 200 to transfer the pre-rolled cones from the cassette 200 to the tray 206. When actuated in a second direction that is opposite the first direction, the screw drives 514 may move the first plate 500 (and correspondingly the implements 306) away from the cassette 200. As will be explained herein, moving the first plate 500 away from the second plate 504 (or retracting the implements 306) may occur after all of the pre-rolled cones within the stacks of pre-rolled cones have been transferred from the cassette 200 to the tray 206.

The second end 508 of the implements 306, once actuated by the one or more actuators, are configured to extend into receptacles 512 of the cassette 200. Details of the receptacles 512 of the cassette 200 are discussed herein, however, as discussed above, the receptacles 512 receive the stack of pre-rolled cones. As such, advancing the implements 306 into the receptacles 512 serves to push the pre-rolled cones out of the receptacles 512 of the cassette 200 and into the tray 206 (which include corresponding receptacles to receive the pre-rolled cones). As shown in FIGS. 5A-5C, the second end 508 of the implements 306 may reside vertically above the receptacles 512, as the implements 306 have not been advanced into the receptacles 512 for transferring the pre-rolled cones. However, during transfer, the second end 508 of the implements 306 enters the receptacles for transferring the pre-rolled cones. To permit the implements 306 to be advanced into the receptacles 512, the implements 306 may be respectively aligned with the receptacles 512. For example, in FIG. 5C, which illustrates the first plate 500 being omitted, individual implements 306 may be aligned with individual receptacles 512.

In some instances, the length of the implements 306 permits the transfer of eight pre-rolled cones from the stack of eight pre-rolled cones. That is, the length of the implements 306 permit the implements 306 to extend into the receptacles 512 for transferring eight of the pre-rolled cones from the stack of pre-rolled cones. However, in some instances, depending upon the amount of pre-rolled cones to be transferred, or the amount of pre-rolled cones within a stack of pre-rolled cones, the length of the implement 306 may be different.

As shown, the transfer mechanism 300 may include seventy-two of the implements 306, however, the transfer mechanism 300 may include more than or less than seventy-two of the implements 306 may be used. Correspondingly, the cassette 200 may include seventy-two of the receptacles 512. However, the cassette 200 may include more than or less than seventy two of the receptacles 512. In some instances, the cassette 200 may include a corresponding number of the receptacles 512 as the number of implements 306.

Although FIGS. 5A-5C illustrate that the transfer mechanism 300 includes the screw drives 514, the transfer mechanism 300 may include other mechanisms configured to actuate the implements 306 (e.g., linear actuators, pneumatic cylinders, etc. Further, the implements 306 may not be coupled to the first plate 500 and/or disposed through the second plate 504, but other mechanisms (e.g., guides) may be used to guide the implements 306 into the receptacles 512. As further shown, in some instances, the first slides 204 may couple to the second plate 504.

Figure 6A:
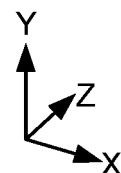
FIGS. 6A and 6B illustrate an example cassette of the cone loading machine of FIG. 1, according to examples of the present disclosure.
Figure 6B:
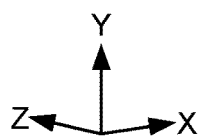

FIGS. 6A and 6B illustrate the cassette 200, according to examples of the present disclosure. In some instances, the cassette 200 includes a first plate 600 defining a plurality of first openings 602, a second plate 604 defining a plurality of second openings 606, and a third plate 608 defining a plurality of third openings 610. The first openings 602, the second openings 606, and the third openings 610 may be concentric with one another. As introduced above, the cassette 200 includes the receptacles 512 that receive the stack of pre-rolled cones. For example, to load the cassette 200 with the stack of pre-rolled cones (e.g., once the cassette 200 is slid out from the housing 114), a stack of pre-rolled cones may be inserted into the first openings 602 and into the receptacles 512. Each of the receptacles 512 may be loaded with a stack of the pre-rolled cones.

In some instances, the receptacles 512 are formed via sleeves 612. In some instances, the sleeves 612, or portions thereof, extend between the first plate 600 and the third plate 608. In some instances, the sleeves 612 include a first section 614 that has a first cross-section which is substantially cylindrically shaped (e.g., about the X-Z plane), and a second section 616 that has a second cross-section which is substantially conically shaped. In some instances, the first section 614 may be formed from a first portion of the sleeve 612, while the second section 616 may be formed from a second portion of the sleeve 612. In some instances, the first section 614 is disposed between the first plate 600 and the second plate 604. The second section 616 may be disposed between the second plate 604 and the third plate 608. Given the conical nature of the second section 616, once the stack of pre-rolled cones are loaded into the receptacles 512, the stack of pre-rolled cones may be retained within the receptacles 512 until the implements 306 are actuated to push the pre-rolled cones out of the receptacles 512. The implements 306 may be respectively insertable into the receptacles 512 via the first openings 602.

The receptacles 512 may include a first end 618 disposed adjacent to, or defined by, the first openings 602, and a second end 620 disposed adjacent to the third plate. A length of the receptacles 512 extends between the first end 618 and the second end 620. In some instances, when the stack of the pre-rolled cones are placed within the receptacles 512, a top of the stack of pre-rolled cones may reside within the receptacle 512 (e.g., beneath the first plate 600) and/or a bottom of the stack of pre-rolled cones may reside vertically beneath the receptacle 512. However, the stacks of pre-rolled cones may remain within the receptacle 512 (e.g., given the conical nature of the second section 616).

The cassette 200 in FIGS. 6A and 6B is shown being loaded with stacks of pre-rolled cones. More particularly, a bottom-most pre-rolled cone of the stack of pre-rolled cones may reside at least partially within the receptacle 512. For example, a top of the bottom-most pre-rolled cone may reside within the receptacle 512, while a bottom of the bottom-most pre-rolled cone may reside external to the receptacle 512 (e.g., hang therefrom).

The third plate 608 may be configured to actuate in the event that one or more of the pre-rolled cones becomes stuck within the receptacles 512 and/or otherwise fails to be transferred to the tray 206. For example, the third plate 608 may actuate to pull the pre-rolled cones out of the receptacle 512 (e.g., in the Y-direction). During actuation of the third plate 608, the third plate 608 may be spaced apart from the second plate 604 (e.g., in the Y-direction), for engaging with the pre-rolled cone and pulling the pre-rolled out of the receptacle 512. During this instance, the third plate 608 may become spaced apart from the second end 620 of the receptacles 512.

As introduced above the third plate 608 may include the third openings 610 through which the pre-rolled cones pass during actuation of the implements 306. However, a diameter (or size) of the third openings 610 may be smaller than a diameter (or size) of an opened top of the pre-rolled cones. Although the third openings 610 may be sized smaller than the opened top of the pre-rolled cones, the pre-rolled cones may be forced out the receptacles 512 (and therefore, the third openings 610), upon actuation of the implements 306. However, when the third plate 608 is actuated, the smaller size of the third openings 610 may serve to pull any remaining portion of the pre-rolled cone out of the receptacle 512, thereby permitting the pre-rolled cone to fall into the tray 206. After being actuated, the third plate 608 may return to a position adjacent to the second end 620 of the receptacles 512.

In some instances, the third plate 608 may slidably engage with one or more posts 622 that extend between the second plate 604, and a guide 624 of the transfer mechanism 300 (discussed herein). For example, the third plate 608 may include passages through which the posts 622 are disposed through, and which permit the third plate 608 to translate (e.g., in the Y-direction). The cassette 200, or more generally, the cone loading machine 100, may include a motor 626 for actuating the third plate 608.

Details of the guide 624 are discussed herein, however, in some instances, the guide 624 may include two separate plates that help to channel the pre-rolled cones from the receptacles 512 to the tray 206. For example, as the pre-rolled cones are pushed out of the receptacles 512, the guide 624 may assist in channel the pre-rolled cones to the tray 206 as the pre-rolled cones fall from the receptacles 512.

Figure 7A:
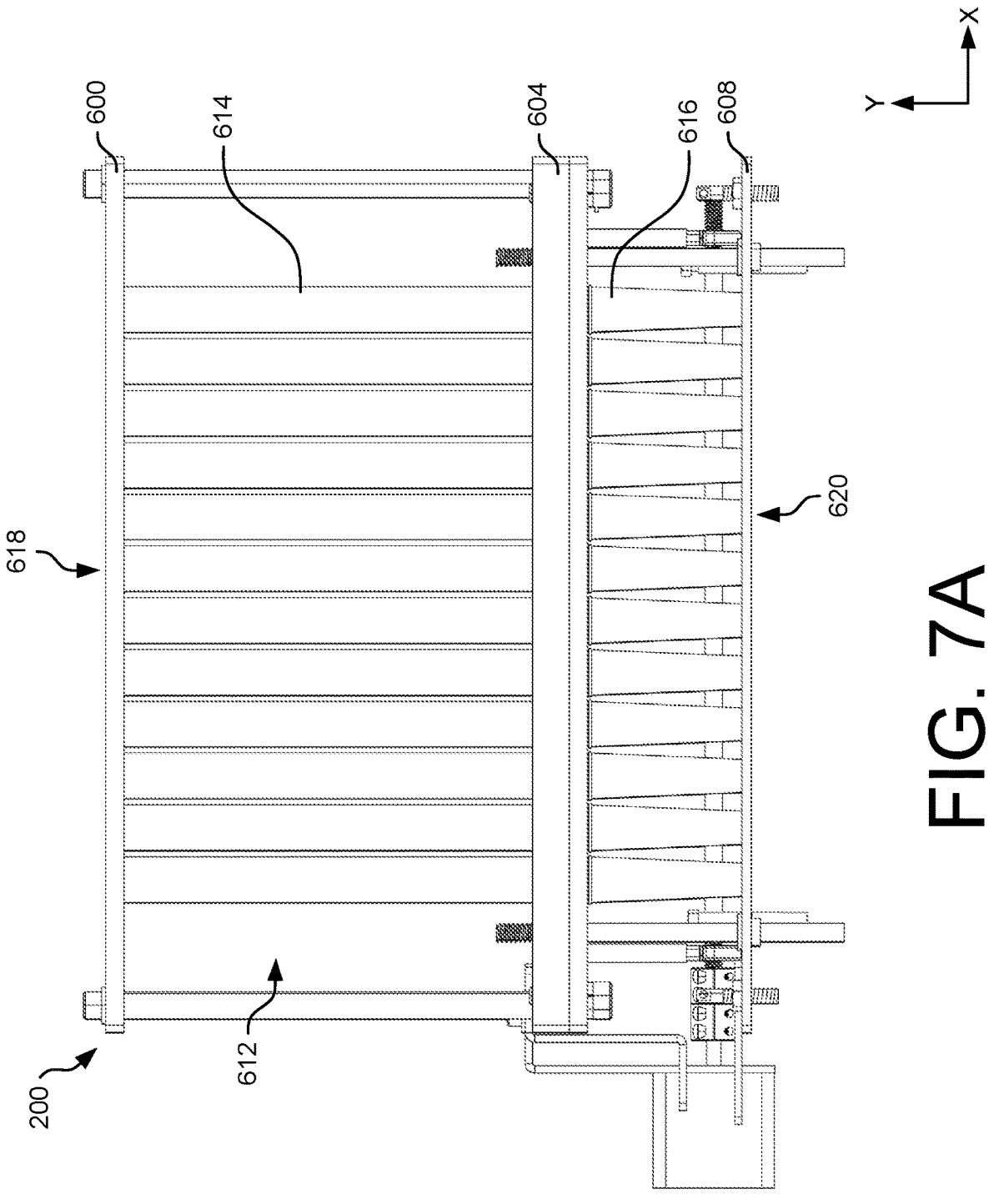
FIGS. 7A and 7B illustrate example receptacles of the cassette of FIGS. 6A and 6B that are configured to receive a stack of pre-rolled cones usable within the cone loading machine of FIG. 1, according to examples of the present disclosure.
Figure 7B:
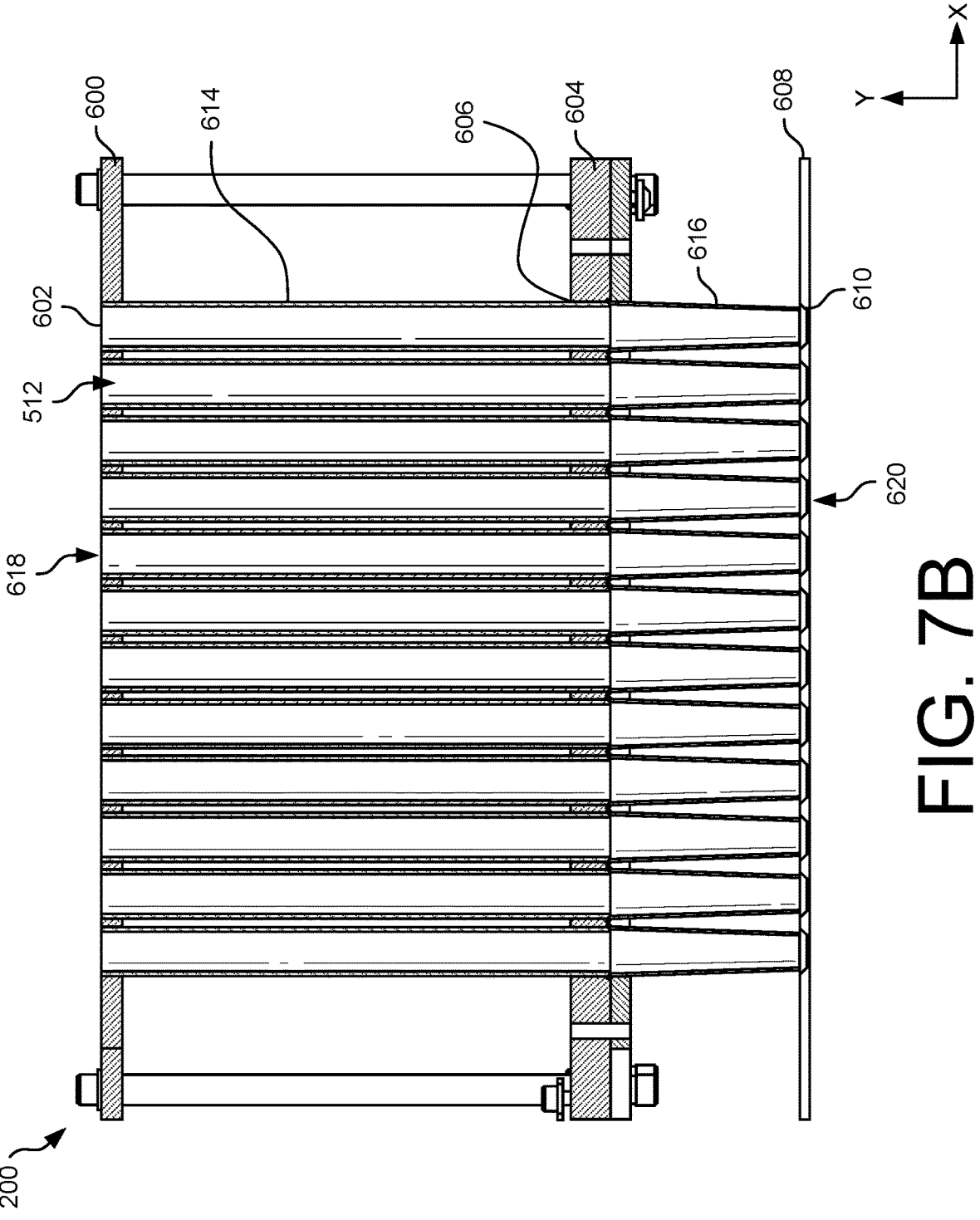

FIGS. 7A and 7B illustrate the cassette 200, showing the guide 624 removed, according to examples of the present disclosure. As introduced above, the sleeves 612 define the receptacles 512 that receive the stack of pre-rolled cones. The sleeves 612 may include the first section 614 and the second section 616. In some instances, the sleeve 612 may be a single piece of material (e.g., unibody), or may include one or more portions of material. For example, a first portion of the sleeve 612 may form the first section 614, and a second portion of the sleeve 612 may form the second section 616. In such instances, the first portion and the second portion of the sleeve 612 may adjoin or otherwise couple within the second plate 604, for example.

In some instances, the first section 614 spans between the first plate 600 and the second plate 604, while the second section 616 spans between the second plate 604 and the third plate 608. The first end 618 of the sleeve 612 may be received within the first openings 602, while the second end 620 of the sleeve 612 may be received within the third openings 610. However, being as the third plate 608 may be actuatable, the second end 620 of the sleeve 612 may be received within or reside adjacent to the third openings 610. The sleeve 612 may be disposed through the second openings 606 in the second plate 604. The first section 614 may include a length (e.g., in the Y-direction) that is longer than a length of the second section 616. The first section 614 may also include a first cross-section that is different than a second cross-section of the second section 616.

Figure 8A:
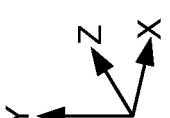
FIGS. 8A and 8B illustrate an example guide of the cassette of FIGS. 6A and 6B that is configured to channel pre-rolled cones usable within the cone loading machine of FIG. 1, according to examples of the present disclosure.
Figure 8A:
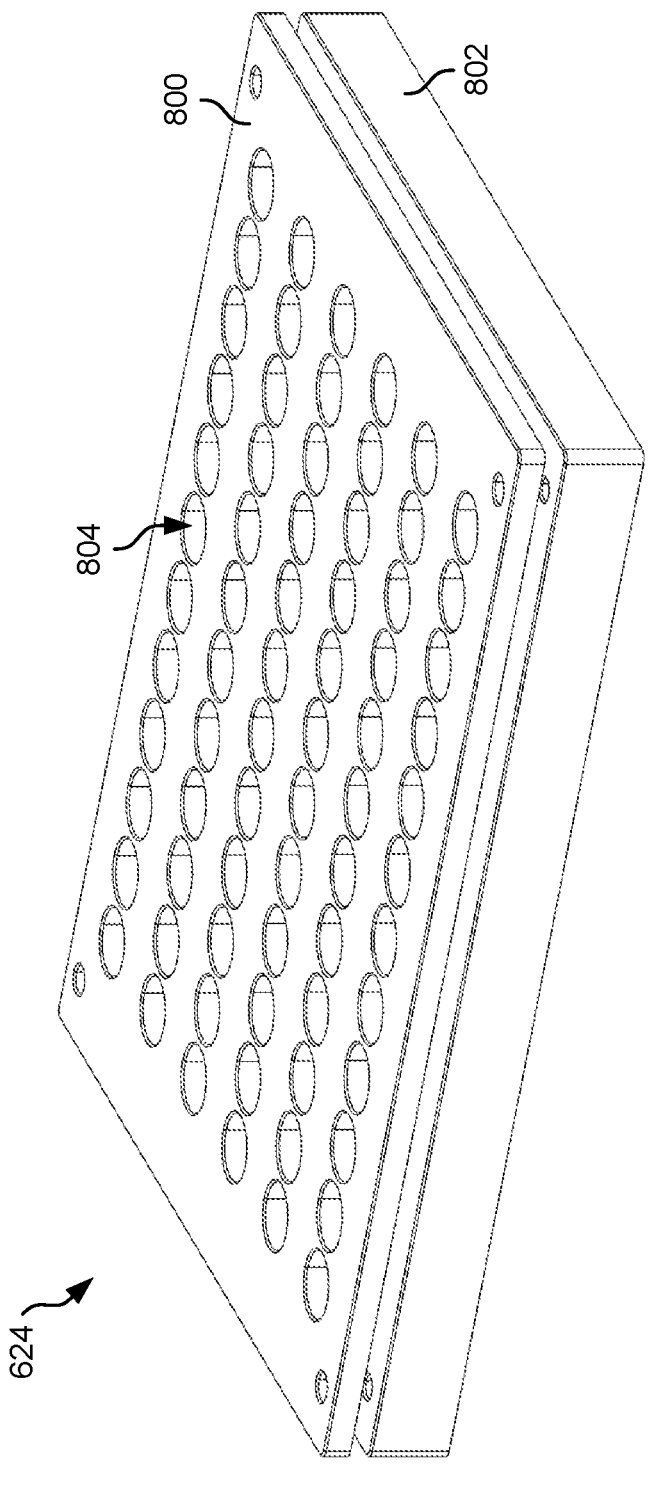
Figure 8B:
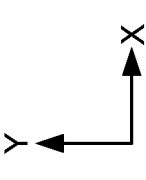
Figure 8B:
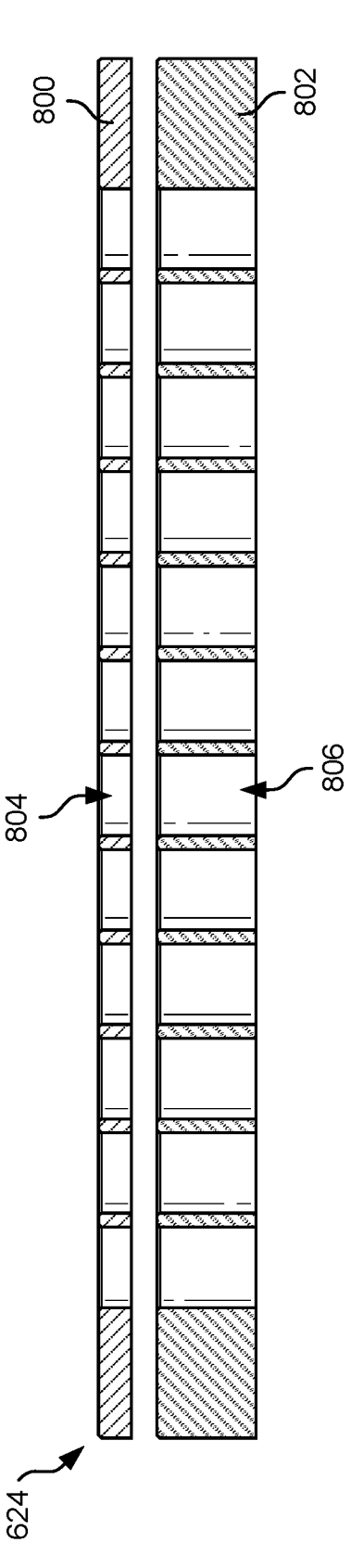
Figure 8B:

FIGS. 8A and 8B illustrate the guide 624 of the cassette 200, according to examples of the present disclosure. In some instances, the guide 624 resides vertically beneath the receptacles 512 for channeling the pre-rolled cones from the receptacles 512 and into the receptacles of the tray 206 (e.g., as the pre-rolled cones fall from the cassette 200 and to the tray 206).

In some instances, the guide 624 may include a first plate 800 and a second plate 802. The first plate 800 may include first channels 804 that align with the receptacles 512 (e.g., concentric), and the second plate 802 may include second channels 806 that align with the receptacles 512 and the first channels 804. As shown, and in some instances, the first plate 800 and the second plate 802 may be spaced apart from one another. The first plate 800 and the second plate 802 may be spaced apart by different lengths depending upon specifics of the pre-rolled cones.

Figure 9:
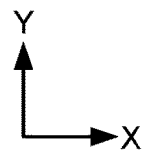
FIG. 9 illustrates a cross-sectional view of the cassette of FIGS. 6A and 6B, according to examples of the present disclosure.

FIG. 9 illustrates a cross-section of the cassette 200, according to examples of the present disclosure. As shown, the receptacles 512 may be aligned with the first channels 804 and the second channels 806 of the guide 624. In doing so, the pre-rolled cones may be transferred in a direction 900, where the direction 900 is aligned within the receptacles 512, the first channels 804, and the second channels 806. The receptacles 512 in FIG. 9 are shown being emptied of the stack of pre-rolled cones. However, when loaded, the stacks of pre-rolled cones may reside within the receptacles 512, respectively, which the first section 614 and the second section 616. The implements 306 may be actuated in a direction that is substantially aligned with the direction 900, for pushing the pre-rolled cones through the receptacles 512 and into the tray 206.

Figure 10A:
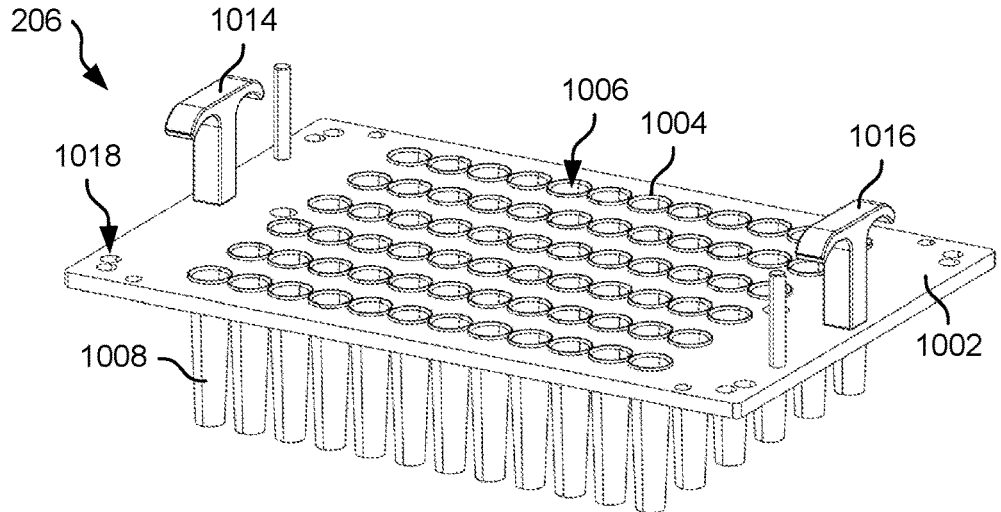
FIGS. 10A and 10B illustrate an example tray of the cone loading machine of FIG. 1 that is configured to receive pre-rolled cones usable within the cone loading machine of FIG. 1, according to examples of the present disclosure.
Figure 10A:
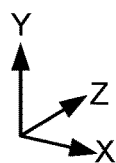
Figure 10B:
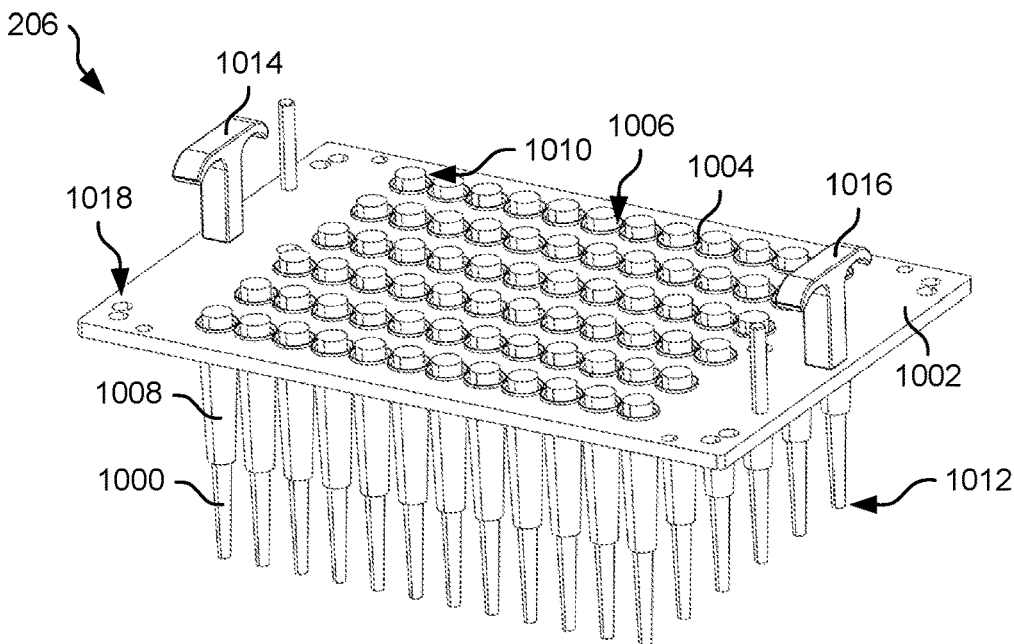
Figure 10B:
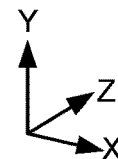

FIGS. 10A and 10B illustrate the tray 206 of the cone loading machine 100, according to examples of the present disclosure. In FIG. 10A, the tray 206 is shown being empty (e.g., not containing any pre-rolled cones), whereas in FIG. 10B, the tray 206 is shown being loaded with pre-rolled cones 1000.

In some instances, the tray 206 includes a plate 1002 having openings 1004 into which the pre-rolled cones 1000 are insertable. The tray 206 includes receptacles 1006 that may be defined by sleeves 1008 coupled to, or disposed on, the plate 1002. During a transfer of the pre-rolled cones 1000 from the cassette 200 to the tray 206, the pre-rolled cones 1000 may enter the receptacles 1006 via the openings 1004. For example, the pre-rolled cones 1000 may fall into the receptacles 1006.

In some instances, once transferred, the pre-rolled cones 1000 are disposed completely or at least partially within the receptacles 1006. For example, as shown in FIG. 10B, individual pre-rolled cones 1000 may include a top 1010 and a bottom 1012. In some instances, the top 1010 may be disposed above the plate 1002 (or the opening 1004), and the bottom 1012 may be disposed external to the receptacle 1006. For example, the bottom 1012 is shown residing vertically beneath the receptacle 1006 (e.g., a bottom of the receptacle 1006).

The sleeves 1008, or more generally the receptacles 1006, may be conically shaped to retain the pre-rolled cones 1000 once the pre-rolled cones 1000 are transferred to the tray 206. As discussed above, once the pre-rolled cones 1000 are loaded into the tray 206, the drawer 208 may be slid out of the housing 114, and the tray 206 may be removed from the drawer 208. Therein, another tray 206 may be interested into the drawer 208 and placed back into the housing 114. The new tray 206 may include empty receptacles 1006 that are loaded via another actuation of the implements 306.

The tray 206 may also include a first handle 1014 and a second handle 1016 that permit the tray 206 to be removed from the drawer 208. Additionally, in some instances, the plate 1002 may include one or more passages 1018 (e.g., four channels) disposed at corners and/or along sides/edges of the plate 1002. The passages 1018 may receive posts that extend from the drawer 208 for aligning the tray 206 within the drawer 208. In doing so, the receptacles 1006 of the tray 206 may be aligned with the receptacles 512 of the cassette 200 such that the pre-rolled cones 1000 are transferrable from the cassette 200 to the tray 206.

Figure 11A:
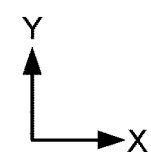
FIGS. 11A and 11B illustrate an example operation of the cassette of FIGS. 6A and 6B, showing pre-rolled cones being transferred from the cassette to the tray of FIGS. 10A and 10B, according to examples of the present disclosure.
Figure 11B:
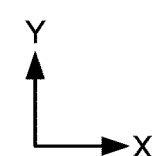

FIGS. 11A and 11B illustrate an example sequence for transferring the pre-rolled cones 1000 from the cassette 200 to the tray 206, according to examples of the present disclosure. In FIGS. 11A and 11B, a cross-sectional view is taken of the cassette 200 and the tray 206.

In FIG. 11A, stacks of pre-rolled cones 1100 are loaded into the receptacles 512 of the cassette 200. As shown, the stacks of pre-rolled cones 1100 may be placed into the receptacles 512, and may maintain their position within receptacles 512. That is, given the conical nature of the second section 616 of the sleeve 612, the stack of pre-rolled cones 1100 may remain disposed in the receptacle 512. Additionally, in some instances, a bottom of the bottom-most pre-rolled cone in the stack of pre-rolled cones 1100 may be disposed beneath the second end 620 of the receptacle 512. As additionally shown in FIG. 11A, an end of the pre-rolled cones 1000 may be disposed within the guide 624, so as to be channeled into the receptacles 1006 of the tray 206. Moreover, prior to being transferred, the receptacles 1006 of the tray 206 are shown being aligned with the receptacles 512 of the cassette 200.

In FIG. 11B, the implements 306 are actuated (e.g., in the Y-direction) to transfer the pre-rolled cones from the cassette 200 to the tray 206. For example, the implements 306 may be actuated into the receptacles 512, and push the stack of pre-rolled cones 1100. During a pushing of the stack of pre-rolled cones 1100, the bottom-most pre-rolled cone of the stack of pre-rolled cones 1100 may exit the second end 620 of the receptacle 512 (out the sleeve 612), and fall into the receptacles 1006 of the tray 206. During this process, the guide 624 may assist (e.g., guide, channel, etc.) the pre-rolled cones 1000 into the tray 206.

After a transfer one of the pre-rolled cones 1000, the tray 206 may be removed and replaced with another tray 206. Alternatively, the tray 206 may be emptied of the pre-rolled cones 1000. Regardless, a tray 206 with empty receptacles 1006 may be placed back into the housing 114, and therein, the implements 306 may be further actuated (e.g., deeper into the receptacles 512) to transfer the now bottom-most pre-rolled cones into the tray 206. This process may repeat until all pre-rolled cones 1000 of the stack of pre-rolled cones 1100 have been transferred to the trays 206. Between loading new trays 206 into the housing 114, the implements 306 may remain disposed within the receptacles 512. However, after all of the pre-rolled cones 1000 of the stack of pre-rolled cones have been transferred, the implements 306 may be fully retracted from the receptacles 512 such that additional stacks of the pre-rolled cones 1100 may be loaded into the cassette 200.

The screw drives 514 are configured to actuate the implements 306 by a certain distance (e.g., step) such that the pre-rolled cones 1000 are individually transferred (e.g., one by one) out of the cassette 200 and into the tray 206. For example, during each step of the screw drives 514 (or the actuators operably coupled thereto), the implements 306 may be pushed into the receptacles 512 by a certain distance that causes one of the pre-rolled cones 1000 of the stack of pre-rolled cones 1100 to fall out of receptacles 1006 and into the tray 206.

Figure 12:
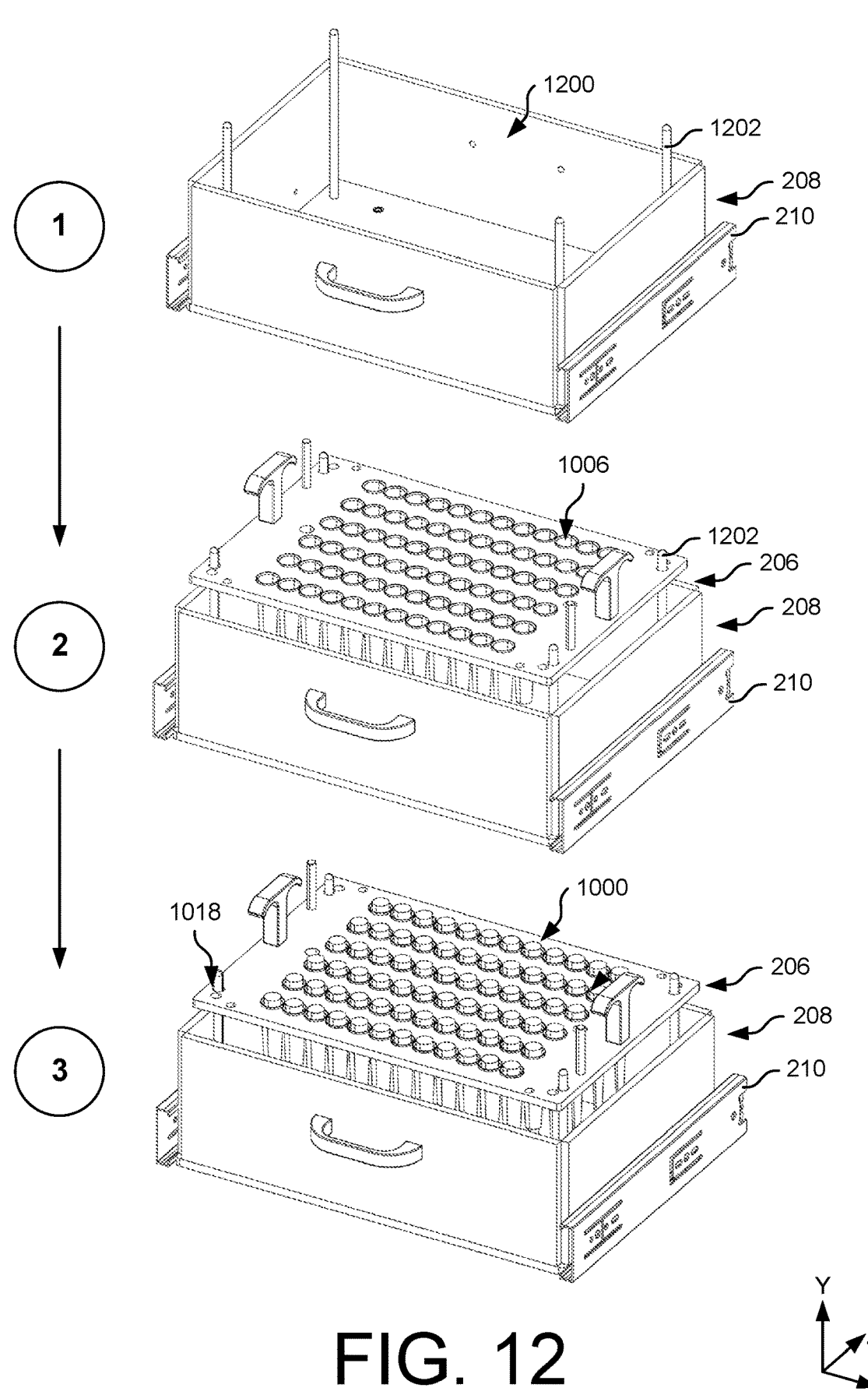
FIG. 12 illustrates the tray of FIGS. 10A and 10B being received within an example drawer of the cone loading machine of FIG. 1, according to examples of the present disclosure.

FIG. 12 illustrates a progression of loading the tray 206 into the drawer 208, according to examples of the present disclosure. At "1" the drawer 208 is shown being empty. The drawer 208 includes a cavity 1200 that at least partially receives the tray 206. In addition, the drawer 208 may include one or more rods 1202 that engage within the passages 1018 of the tray 206. In some instances, the engagement between the rods 1202 and the passages 1018 serves to align the tray 206 within the drawer 208. In doing so, the pre-rolled cones 1000 may be transferred successfully into the receptacles 1006 of the tray 206.

For example, at "2" the tray 206 is shown being placed within the drawer 208, and individual rods of the rods 1202 may be received within the individual passages of the passages 1018. As such, the tray 206 may be slid over/onto the rods 1202. However, although the rods 1202 and the passages 1018 are described for aligning the tray 206 within the drawer 208, other alignment features (e.g., slots, keyways, tabs, etc.) may be included. The drawer 208 may be slid out from the housing 114, via the second slides 210, for placing the tray 206 into the drawer 208

At "3" the tray 206 is loaded with the pre-rolled cones 1000. After being loaded, the tray 206 may be removed from the drawer 208. For example, the drawer 208 may be slid out of the housing 114, via the second slides 210, and the tray 206 (e.g., via the first handle 1014 and the second handle 1016) may be removed from the drawer 208. Therein, the tray 206 may be replaced with another tray 206 that is empty, and accordingly, the subsequent tray 206 may be loaded with other pre-rolled cones 1000.

Figure 13:
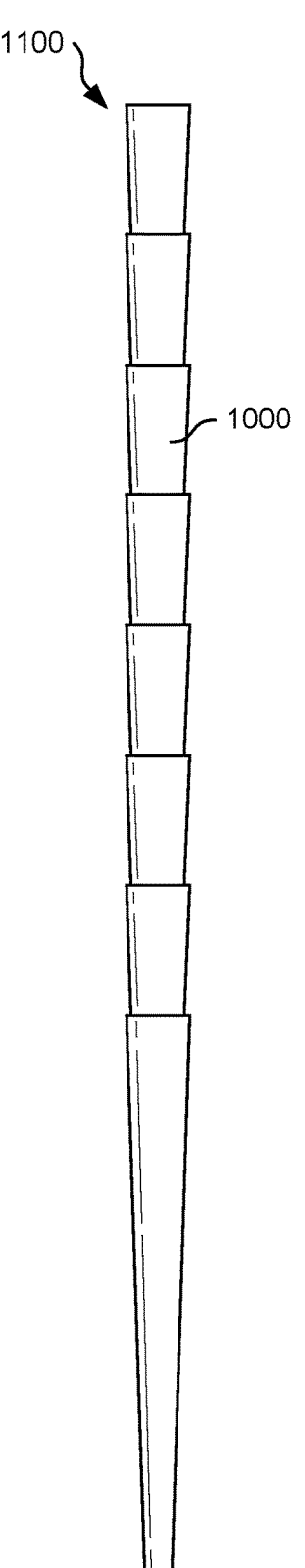
FIG. 13 illustrates an example stack of pre-rolled cones usable within the cone loading machine of FIG. 1, according to examples of the present disclosure.
Figure 13:
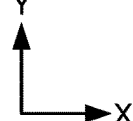

FIG. 13 illustrates an example stack of pre-rolled cones 1100, according to examples of the present disclosure. As shown, the pre-rolled cones 1000 may be stacked together to form the stack of pre-rolled cones 1100 The stack of pre-rolled cones 1100 is insertable into the receptacles 512 of the cassette 200, and the pre-rolled cones 1000 are individually pushed out of the receptacles 512 and into the receptacles 1006 of the tray 206 via the implements 306. As shown, the stack of pre-rolled cones 1100 may include eight pre-rolled cones 1000. However, the stack of pre-rolled cones 1100 may include more than or less than eight pre-rolled cones 1000.

The pre-rolled cones 1000 may include an opened top and a partially enclosed base. The pre-rolled cones 1000 may be stacked such that the partially enclosed base of one pre-rolled cone 1000 is inserted into the opened top of another pre-rolled cone 1000.

Figure 14:
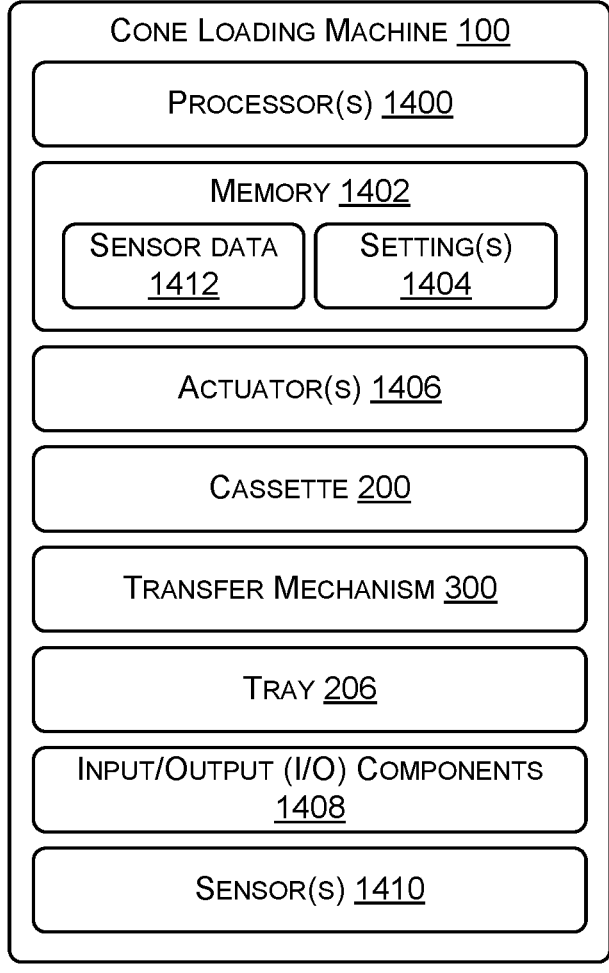
FIG. 14 illustrates a component diagram of the cone loading machine of FIG. 1, according to examples of the present disclosure.

FIG. 14 illustrates select components of the cone loading machine 100, according to examples of the present disclosure. As introduced above, the cone loading machine 100 includes the cassette 200, the tray 206, and the transfer mechanism 300 (having the implements 306). In addition, the cone loading machine 100 is shown including processor(s) 1400 and memory 1402, where the processor(s) 1400 may perform various functions and operations associated with transferring the pre-rolled cones 1000 from the cassette 200 to the tray 206, and the memory 1402 may store instructions executable by the processor(s) 1400 to perform the operations described herein.

The cone loading machine 100 may operate according to certain setting(s) 1404. In some instances, the setting(s) 1404 may indicate an amount by which the screw drives 514 are configured to actuate. For example, the screw drives 514 may be configured to actuate by a certain distance (e.g., step) such that the pre-rolled cones 1000 are individually transferred (e.g., one by one) from the cassette 200 and to the tray 206. During each step, the implements 306 may be pushed into the receptacles 512 by a certain distance that causes one of the pre-rolled cones 1000 to fall out of receptacles 512 and into the tray 206. The setting(s) 1404 may also indicate a number of steps to be performed for transferring the pre-rolled cones 1000 within the stack of pre-rolled cones 1100. For example, if the stack of pre-rolled cones 1100 include eight pre-rolled cones 1000, the setting(s) 1404 may indicate that eight steps (e.g., steps of the implements 306) are to be performed for transferring all of the pre-rolled cones 1000. After transferring the entire stack of pre-rolled cones 1100, the implements 306 may be retracted (e.g., from knowing the amount of the pre-rolled cones 1000 within the stack of pre-rolled cones 1100).

In some instances, the setting(s) 1404 may additionally or alternatively indicate whether the cone loading machine 1100 s to operate autonomously, semi-autonomously, or manually. For example, after loading a first tray 206 with the pre-rolled cones 1000, an operator may remove the first tray 206 and replace the first tray 206 with a second tray 206 to be loaded with pre-rolled cones 1000. In some instances, the cone loading machine 100 may wait a threshold period of time (e.g., thirty seconds, one minute, etc.) before the implements 306 are actuated to transfer the pre-rolled cones 1000 into the second tray 206, or may await receiving input from the operator. The threshold period of time may permit the operator sufficient time to unload the first tray 206, and load the second tray 206 into the drawer 208. The cone loading machine 100 may therefore autonomously operate to actuate the implements 306 to transfer the pre-rolled cones 1000, or may await until an explicit input provided from the operator. Such operational controls may be indicated in the setting(s) 1404.

The cone loading machine 100 is also shown including actuator(s) 1406. The actuator(s) 1406 may drive or otherwise impart movement to the screw drives 514 for moving the implements 306 to transfer the pre-rolled cones 1000. The actuator(s) 1406 (e.g., the motor 626) may also move the second plate 604 in the event that one or more of the pre-rolled cones 1000 becomes stuck, or is unsuccessfully transferred from the cassette to the tray 206. The actuator(s) 1406 may include stepper motors, pneumatic or hydraulic cylinders, and so forth.

The cone loading machine 100 may include various input/output (I/O) components 1408. In some instances, the I/O components 1408 include displays (e.g., touch screen), keyboard(s), speaker(s), microphone(s), lighting element(s), button(s), knob(s), and so forth. In some instances, the setting(s) 1404 are provided via a display screen or other input of the cone loading machine 100. For example, an operator may provide, via the display screen, the number of pre-rolled cones 1000 within the stack of pre-rolled cones 1100, an amount by which the implements 306 are to translate during a transfer (e.g., for transferring one pre-rolled cone 1000 from the stack of pre-rolled cones 1100), etc. The operator, using the display screen, may also provide indications of when to start and stop the transfer of the pre-rolled cones 1000.

Additionally, such operations may be controlled via knob(s) and/or button(s) of the cone loading machine 100. For example, the operator may press a button on the cone loading machine 100 to begin transfer of the pre-rolled cones 1000. In some instances, a press of the button may cause the implements to transfer one pre-rolled cone 1000 from the stack of pre-rolled cones 1100 to the tray 206. Therein, for each successive transfer, the operator may again press the button. For example, after replacing the tray 206, the operator may press the button to transfer the pre-rolled cones 1000 into the tray 206.

In some instances, the I/O components 1408 may indicate when the cone loading machine 100 is transferring the pre-rolled cones 1000, when the tray 206 needs to be replaced, when the cassette 200 needs to be replaced, when the pre-rolled cone(s) 1000 have become stuck, and so forth. For example, the lighting element(s) may illuminate to a first color (e.g., yellow), first intensity, etc. when transferring is occurring, may illuminate to a second color (e.g., green), second intensity, etc. after transfer has occurred, may illuminate to a third color (e.g., red), third intensity, etc. when an unsuccessful transfer has occurred, may illuminate to a fourth color (e.g., blue), fourth intensity, etc. when the tray 206 needs to be replaced, and/or may illuminate to a fifth color (e.g., orange), fifth intensity, etc. when the cassette 200 needs to be replenished. Additionally, or alternative, indications may be output on the display screen, via the loudspeakers, and so forth.

The cone loading machine 100 may also include sensor(s) 1410 that generate sensor data 1412. The sensor(s) 1410 may include proximity sensor(s), cameras, resistive or capacitive type sensor(s), pressure sensor(s), weight sensor(s), laser(s), switches, ultrasonic sensor(s), etc. In some instances, the sensor(s) 1410 may be used to determine whether the pre-rolled cones 1000 have been successfully transferred from the cassette to the tray 206, whether any of the pre-rolled cones 1000 have become stuck during the transfer, whether the cassette 200 is empty of the pre-rolled cones 1000, an amount of pre-rolled cones 1000 in the cassette 200, and so forth. For example, camera(s) may be arranged adjacent to the cassette 200 and/or the tray 206 to determine whether any of the pre-rolled cones 1000 have become stuck. If so, the actuator(s) 1406 may be instructed to actuate the third plate 608. In other instances, the sensor(s) 1410 may be arranged to image or sense the receptacles 1006 of the tray 206, for determining whether all of the receptacles 1006 are filled. Alternatively, the sensor(s) 1410 may be arranged adjacent to the second end 620 of the receptacles 512 to determine whether any remaining pre-rolled cones 1000 are in the receptacles 512 (e.g., as the pre-rolled cones 1000 at least partially hang out of the receptacles 512 before being transferred).

As used herein, a processor, such as the processor(s) 1400, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 1402, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1400. In some instances, the memory 1402 may represent one or more non-transitory computer-readable media storing instructions that, when executed by the processor(s) 1400, cause the processor(s) 1400 to perform recited operations.

Figure 15:
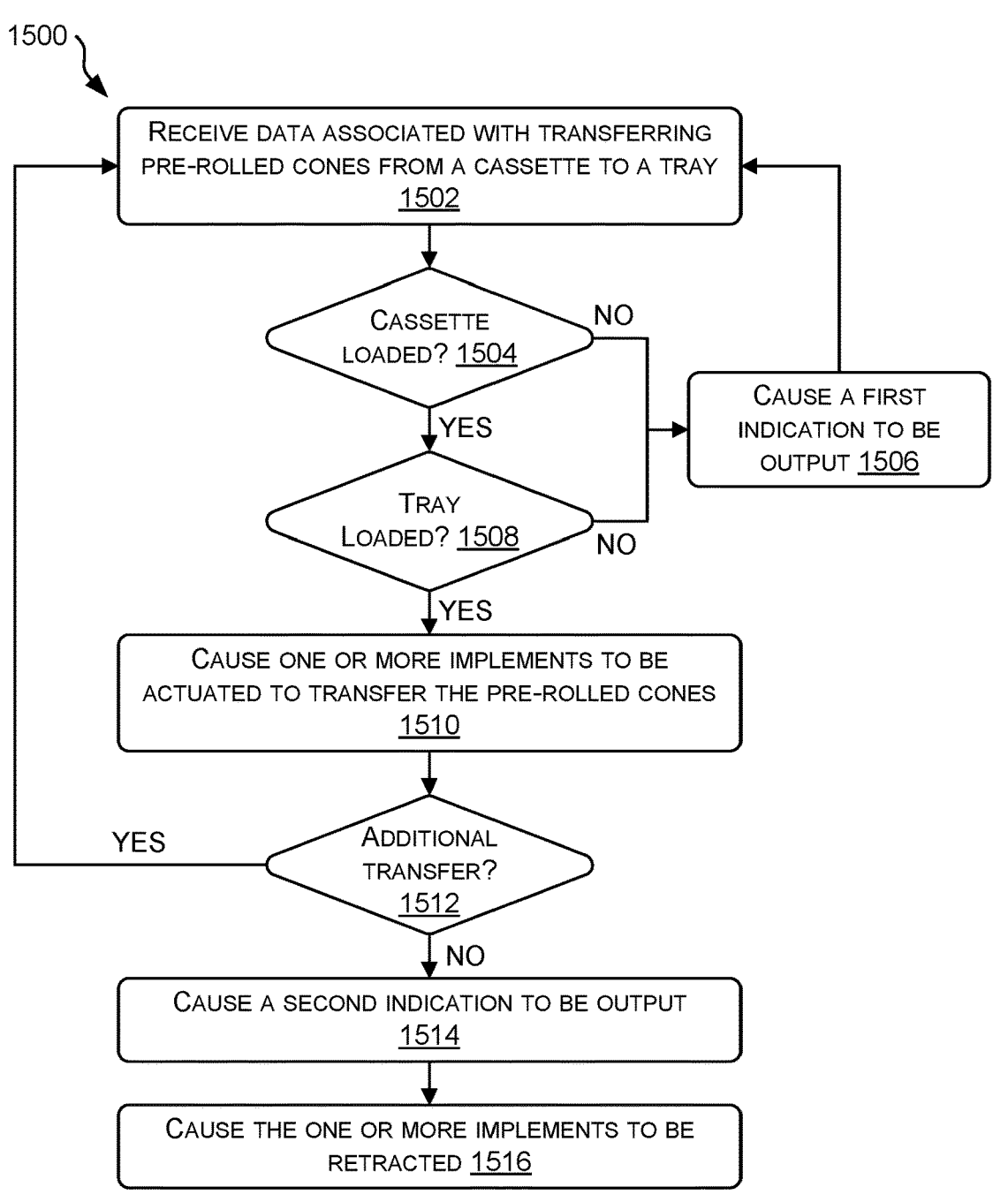
FIG. 15 illustrates an example process implemented by the cone loading machine of FIG. 1, according to examples of the present disclosure.

FIG. 15 illustrates an example process 1500 for transferring pre-rolled cones. The process 1500 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process 1500 is described with reference to the environments, architectures, devices, and systems described in the examples herein, such as, for example those described with respect to FIGS. 1-14, although the process 1500 may be implemented in a wide variety of other environments, architectures, devices, and systems.

At 1502, the process 1500 may include receiving data associated with transferring pre-rolled cones from a cassette to a tray. For example, an operator of the cone loading machine 100, after loading the stacks of pre-rolled cones 1100 into the cassette 200, may provide an input to a display screen, knob, or other input to indicate to begin the transfer process. The operator may also load a tray into the cone loading machine 100. In some instances, instead of the operator providing an explicit input to begin the transfer process, the cone loading machine 100 may sense the stacks of pre-rolled cones 1100 within the cassette 200 and therein, autonomously or semi-autonomously operate to transfer the pre-rolled cones 1000.

At 1504, the process 1500 may include determining whether the cassette is loaded. For example, in some instances, the cone loading machine 100 may be instructed to transfer the pre-rolled cones 1000 even though the cassette 200 is not loaded into the cone loading machine 100 (e.g., inadvertent input to transfer), and/or the cassette 200 may be empty. In these scenarios, before actuating the implements 306 into the cassette 200, the process 1500 may check to determine the cassette 200 is loaded into the cone loading machine 100, and/or that there are pre-rolled cones 1000 to be transferred. In some instances, the sensor(s) 1410 may be used to check or determine that the cassette 200 is loaded into the cone loading machine 100. Alternatively, instead of determining that the cassette 200 is loaded, the process 1500 may determine whether the first door 116 is closed before initiating transfer of the pre-rolled cones 1000. If at 1504 the process 1500 determines that the cassette 200 is not loaded into the cone loading machine 100, the process 1500 may follow the "NO" route and proceed to 1506.

At 1506, the process 1500 may include causing a first indication to be output. For example, lighting element(s), the display screen, speaker(s), etc. may output an indication that the cone loading machine 100 is not loaded with the cassette 200, and/or that pre-rolled cones 1000 are not loaded into the cassette 200. In some instances, the first indication may serve as an error that transfer has not commenced. In turn, the operator of the machine may rectify the error. From 1506, the process 1500 may loop to 1502, whereby the operator may provide additional input to begin the transfer process, after correcting the error.

Alternatively, if at 1504 the process 1500 determines that the cassette 200 is loaded, the process 1500 may follow the "YES" route and proceed to 1508. At 1508, the process 1500 may include determining whether the tray is loaded into the cone loading machine. For example, to avoid transferring the pre-rolled cones 1000 without a tray 206 to receive the pre-rolled cones 1000, the process 1500 may first determine whether the tray 206 is loaded into the cone loading machine 100. The sensor(s) 1410, for example, may be used to determine whether the tray 206 is loaded into the cone loading machine 100, and/or that the second door 118 is closed, for example, before permitting the transfer. In some instances, instead of determining whether the tray 206 is loaded, the process 1500 may determine whether the receptacles 512 of the tray 206 are empty (e.g., for receiving the pre-rolled cones). If at 1508, the process 1500 determines that the tray 206 is not loaded, or is full, the process 1500 may follow the "NO" route and proceed to 1506, whereby the process 1500 may cause the first indication to be output.

If at 1508 the process 1500 determines that the tray 206 is loaded, the process 1500 may follow the "YES" route and proceed to 1510. At 1510, the process 1500 may include causing one or more implements to be actuated to transfer the pre-rolled cones. For example, the actuator(s) 1406 may actuate to drive the screw drives 514 and move the implements 306 into the cassette 200 to transfer the pre-rolled cones 1000 from the cassette 200 and into the tray 206. As discussed herein, the implements 306 may be actuated by a certain distance (e.g., step) to transfer a single pre-rolled cone 1000 from the stack of pre-rolled cones 1100 to the tray 206.

At 1512, the process 1500 may include determining whether there are additional transfers. For example, the process 1500 may compare the number of pre-rolled cones 1000 that have been transferred with the number of pre-rolled cones 1000 within the stack of pre-rolled cones 1100. As an example, if only one pre-rolled cone 1000 from the stack of pre-rolled cones 1100 has been transferred, and the stack of pre-rolled cones 1100 includes eight pre-rolled cones 1000 (via the setting(s) 1404), the process 1500 may determine that there are still seven pre-rolled cones 1000 to be transferred. Whether there are additional transfers may also be based on an amount of translation of the implements 306 (e.g., as the farther the implements 306 descend into the receptacles 512, the more pre-rolled cones 1000 that may have been transferred). If at 1512 the process 1500 determines that there are additional transfers, the process may follow the "YES" route and loop to 1502.

If there are additional transfers, the operator may replace the tray 206 with another tray 206 that includes empty receptacles 1006. After replacing the tray 206, the operator may provide an input the cone loading machine 100 (e.g., button press, display screen, etc.), to indicate a subsequent transfer of the pre-rolled cones 1000. Therein, the process 1500 may determine whether the cassette 200 is loaded and/or the tray 206 is loaded.

Alternatively, if at 1512 the process 1500 determines that there are not additional transfers, the process 1500 may follow the "NO" route and proceed to 1514. At 1514, the process 1500 may include causing a second indication to be output. The second indication, which may be output via the display screen, lighting element(s), speaker(s), etc., may indicate that all of the pre-rolled cones 1000 within the cassette 200 have been transferred. This may, for example, signal to the operator to replace the cassette 200 and/or load the cassette 200 with additional stacks of pre-rolled cones 1100.

At 1516, the process 1500 may include causing the one or more implements to be retracted. For example, after all the pre-rolled cones 1000 have been transferred, the implements 306 may be retracted such that the cassette 200 may be reloaded and/or replaced. That is, before sliding the cassette 200 out of the housing 114, or to permit the cassette 200 to be slid out of the housing 114, the implements 306 may first be retracted.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device comprising:
a housing;
a cassette disposed within the housing, the cassette including first receptacles that are configured to receive a stack of pre-rolled cones, individual receptacles of the first receptacles having:
a first section with a first cross-sectional shape, and
a second section with a second cross-sectional shape that is different than the first cross-sectional shape;
a tray disposed within the housing, the tray including second receptacles; and
a transfer mechanism including implements configured to transfer a pre-rolled cone from the stack of pre-rolled cones from the individual receptacles of the first receptacles to individual receptacles of the second receptacles.

2. The device of claim 1, further comprising a drawer configured to receive the tray, and wherein:
the cassette is slidably engaged with the housing; and
the drawer is slidably engaged with the housing.

3. The device of claim 1, wherein:
the first section has a first length; and
the second section has a second length that is shorter than the first length.

4. The device of claim 1, further comprising one or more actuators coupled to the implements, the one or more actuators being configured actuate the implements to transfer the pre-rolled cone from the stack of pre-rolled cones from the first receptacles to the second receptacles.

5. The device of claim 1, wherein the implements are at least partially disposed within the first receptacles as the implements transfer the pre-rolled cone from the stack of pre-rolled cones from the first receptacles to the second receptacles.

6. The device of claim 1, wherein the individual receptacles of the second receptacles include:
a third section having a third cross-sectional shape; and
a fourth section having a fourth cross-sectional shape that is different than the third cross-sectional shape.

7. A device comprising:
a cassette including first receptacles that receive a stack of pre-rolled cones;
a tray including second receptacles that receive a pre-rolled cone from the stack of pre-rolled cones, respectively, the tray being disposable vertically beneath the cassette; and
a transfer mechanism including implements that are actuatable to be disposed internal to the stack of pre-rolled cones, respectively, to transfer the pre-rolled cone from the stack of pre-rolled cones to the second receptacles.

8. The device of claim 7, wherein:
the device includes a top and a bottom;
the transfer mechanism is located closer to the top than the cassette and the tray; and
the cassette is located closer to the top than the tray.

9. The device of claim 7, further comprising:
one or more processors; and
one or more non-transitory computer-readable media storing computer-executable instructions that, when executed by the one or more processors, cause the one or more processors to perform operations comprising:
receiving data associated with transferring the pre-rolled cone from the stack of pre-rolled cones; and
causing, based at least in part on the data, the implements to be actuated to transfer the pre-rolled cone from the stack of pre-rolled cones.

10. The device of claim 9, the operations further comprising:
receiving second data associated with transferring a second pre-rolled cone from the stack of pre-rolled cones; and
causing, based at least in part on the second data, the implements to be actuated to transfer the second pre-rolled cone from the stack of pre-rolled cones,
wherein the second pre-rolled cone is transferred into third receptacles of a second tray.

11. The device of claim 7, wherein the implements reside at least partially within the first receptacles during transfer of the pre-rolled cone from the stack of pre-rolled cones.

12. The device of claim 7, wherein the implements are concentrically aligned with the first receptacles and the second receptacles.

13. The device of claim 7, wherein:
the first receptacles include a first section having a first cross-section and a first length;
the second receptacles include a second section having a second cross-section and a second length; and
at least one of:
the first cross-section is different than the second cross-section, or
the first length is different than the second length.

14. The device of claim 7, further comprising:
a housing; and
a drawer configured to receive the tray,
wherein:
the cassette is slidably engaged with the housing, and
the drawer is slidably engaged with the housing.

15. A device comprising:
a cassette including first receptacles, wherein individual first receptacles of the first receptacles are configured to receive a stack of pre-rolled cones;
a tray including second receptacles, the tray being located vertically below the cassette, wherein individual second receptacles of the second receptacles are configured to receive a pre-rolled cone from the stack of pre-rolled cones; and
a transfer mechanism including implements that are located vertically above the cassette, wherein individual implements of the implements are configured to move in a direction parallel to a lengthwise direction of the pre-rolled cone to transfer the pre-rolled cone from the stack of pre-rolled cones from the first receptacles to the second receptacles.

16. The device of claim 15, further comprising:
one or more processors; and
one or more non-transitory computer-readable media storing computer-executable instructions that, when executed by the one or more processors, cause the one or more processors to perform operations comprising:
receiving data associated with transferring the pre-rolled cone from the stack of pre-rolled cones; and
causing, based at least in part on the data, the implements to be actuated to transfer the pre-rolled cone from the stack of pre-rolled cones.

17. The device of claim 16, the operations further comprising:

receiving second data associated with transferring a second pre-rolled cone from the stack of pre-rolled cones; and causing, based at least in part on the second data, the implements to be actuated to transfer the second pre-rolled cone from the stack of pre-rolled cones, wherein the second pre-rolled cone is transferred into third receptacles of a second tray.

18. The device of claim 15, wherein:

the first receptacles include a first section having a first cross-section and a first length;

the second receptacles include a second section having a second cross-section and a second length; and at least one of:

the first cross-section is different than the second cross-section, or the first length is different than the second length.

19. The device of claim 15, further comprising:

a housing; and a drawer configured to receive the tray, wherein:

the cassette is slidably engaged with the housing, and the drawer is slidably engaged with the housing.

20. The device of claim 15, further comprising one or more actuators coupled to the implements, the one or more actuators being configured actuate the implements to transfer the pre-rolled cone from the stack of pre-rolled cones from the first receptacles to the second receptacles.

\*    \*    \*    \*    \*